(No Model.)  8 Sheets—Sheet 1.

F. MEISEL.
MACHINE FOR CUTTING, FOLDING, AND PILING CLOTH, PAPER, OR OTHER FABRICS.

No. 517,653.  Patented Apr. 3, 1894.

Witnesses.  Inventor.

(No Model.) 8 Sheets—Sheet 2.

F. MEISEL.
MACHINE FOR CUTTING, FOLDING, AND PILING CLOTH, PAPER, OR OTHER FABRICS.

No. 517,653. Patented Apr. 3, 1894.

Witnesses.
Harry H. Aiken
Clarence R. Davis

Inventor.
Francis Meisel
by Teschemacher
Atty

THE NATIONAL LITHOGRAPHING COMPANY,
WASHINGTON, D. C.

(No Model.) 8 Sheets—Sheet 3.

F. MEISEL.
MACHINE FOR CUTTING, FOLDING, AND PILING CLOTH, PAPER, OR OTHER FABRICS.

No. 517,653. Patented Apr. 3, 1894.

Witnesses. Inventor.

(No Model.)
8 Sheets—Sheet 4.

F. MEISEL.
MACHINE FOR CUTTING, FOLDING, AND PILING CLOTH, PAPER, OR OTHER FABRICS.

No. 517,653.
Patented Apr. 3, 1894.

Witnesses.
Harry H. Aiken
Clarence R. Davis

Inventor.
Francis Meisel
by R. Teschemacher
Atty (No Model.) 8 Sheets—Sheet 5.
F. MEISEL.
MACHINE FOR CUTTING, FOLDING, AND PILING CLOTH, PAPER, OR OTHER FABRICS.
No. 517,653. Patented Apr. 3, 1894.
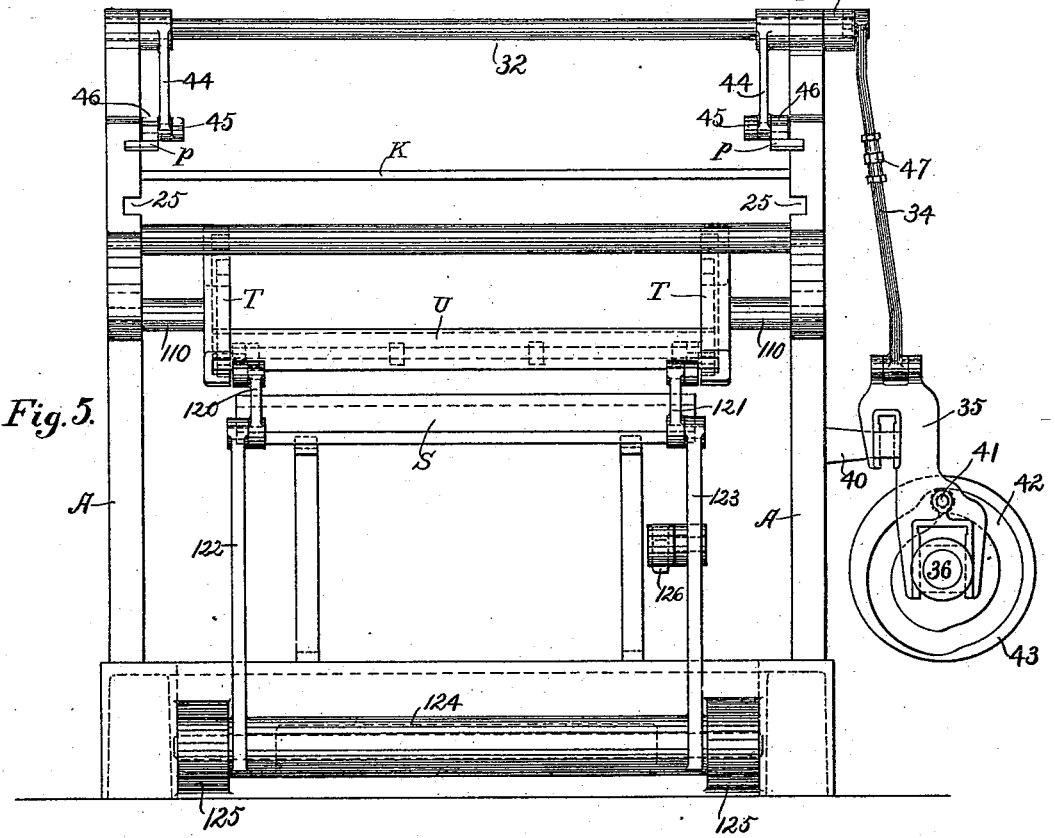
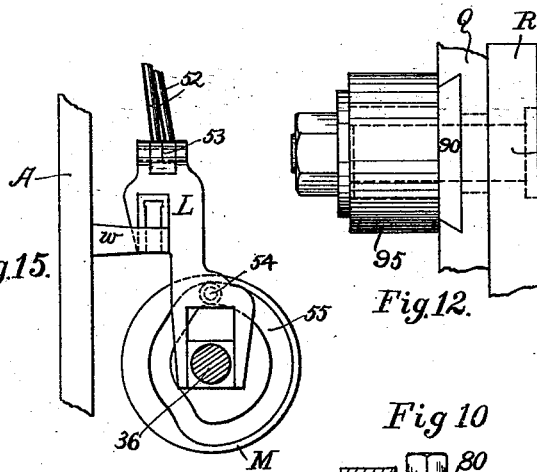
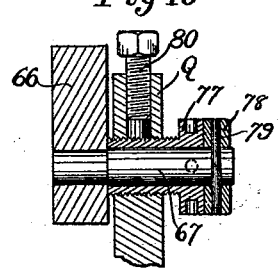
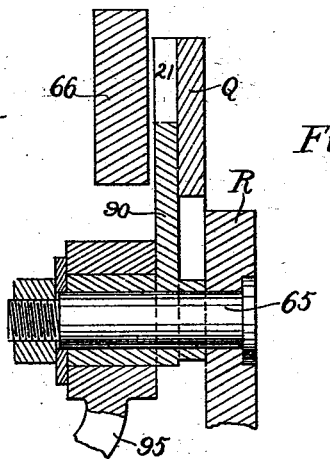
Witnesses. Inventor.

(No Model.) 8 Sheets—Sheet 6.

F. MEISEL.
MACHINE FOR CUTTING, FOLDING, AND PILING CLOTH, PAPER, OR OTHER FABRICS.

No. 517,653. Patented Apr. 3, 1894.

Witnesses. Inventor.
Francis Meisel

THE NATIONAL LITHOGRAPHING COMPANY,
WASHINGTON, D. C.

(No Model.) 8 Sheets—Sheet 7.

F. MEISEL.
MACHINE FOR CUTTING, FOLDING, AND PILING CLOTH, PAPER, OR OTHER FABRICS.

No. 517,653. Patented Apr. 3, 1894.

Witnesses. Inventor.

(No Model.) 8 Sheets—Sheet 8.

F. MEISEL.
MACHINE FOR CUTTING, FOLDING, AND PILING CLOTH, PAPER, OR OTHER FABRICS.

No. 517,653. Patented Apr. 3, 1894.

Witnesses.

Inventor
Francis Meisel

UNITED STATES PATENT OFFICE.

FRANCIS MEISEL, OF BOSTON, MASSACHUSETTS.

MACHINE FOR CUTTING, FOLDING, AND PILING CLOTH, PAPER, OR OTHER FABRICS.

SPECIFICATION forming part of Letters Patent No. 517,653, dated April 3, 1894.

Application filed April 24, 1893. Serial No. 471,645. (No model.)

*To all whom it may concern:*

Be it known that I, FRANCIS MEISEL, a citizen of the United States, residing at Boston, in the county of Suffolk and State of Massachusetts, have invented certain Improvements in Machines for Cutting into Lengths, Folding, and Piling Cloth, Paper, or other Fabric for Bags and for other Purposes, of which the following is a full, clear, and exact description, reference being had to the accompanying drawings, making part of this specification, in which—

Figure 1:
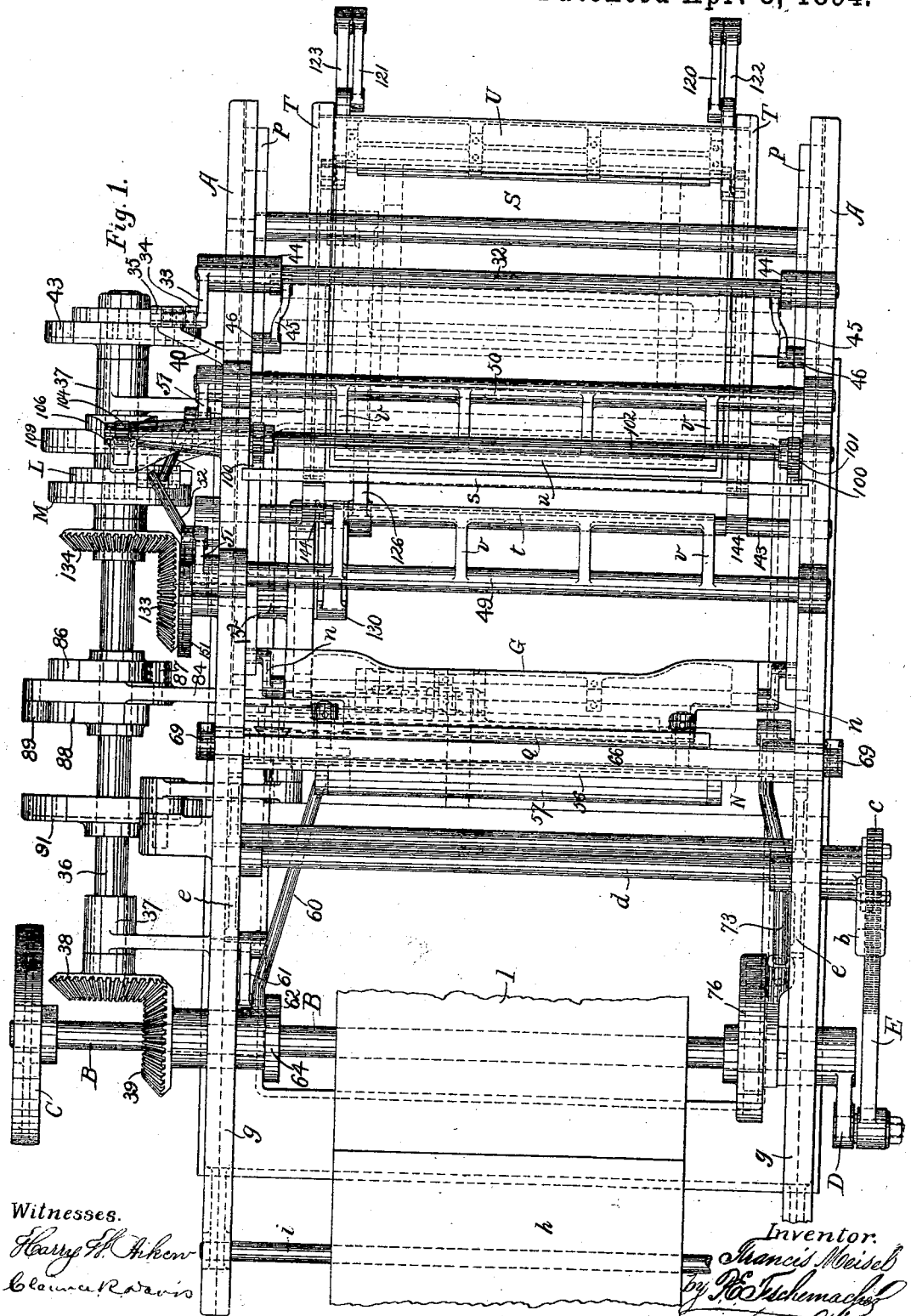
Figure 2:
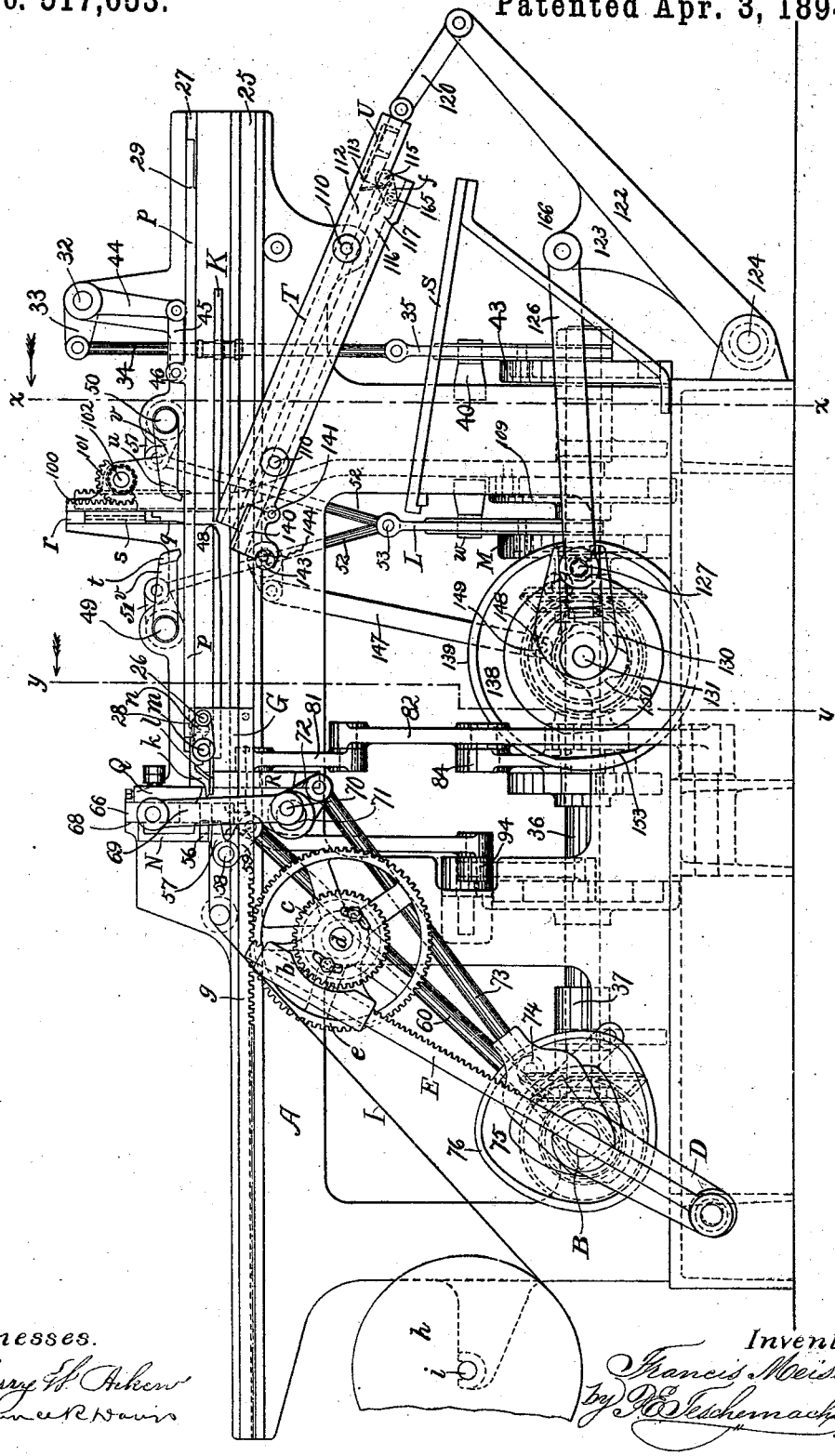
Figure 3:
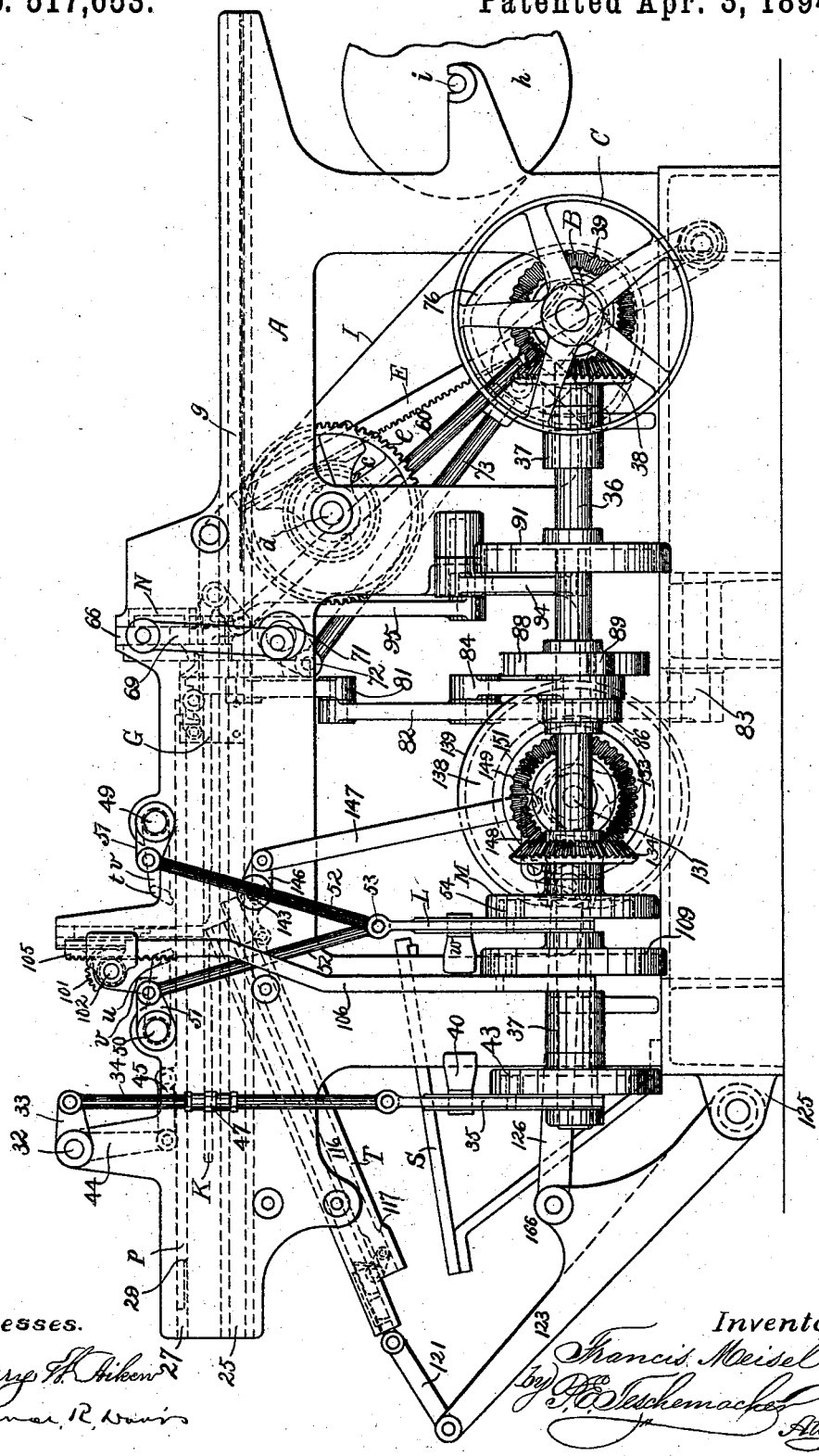
Figure 4:
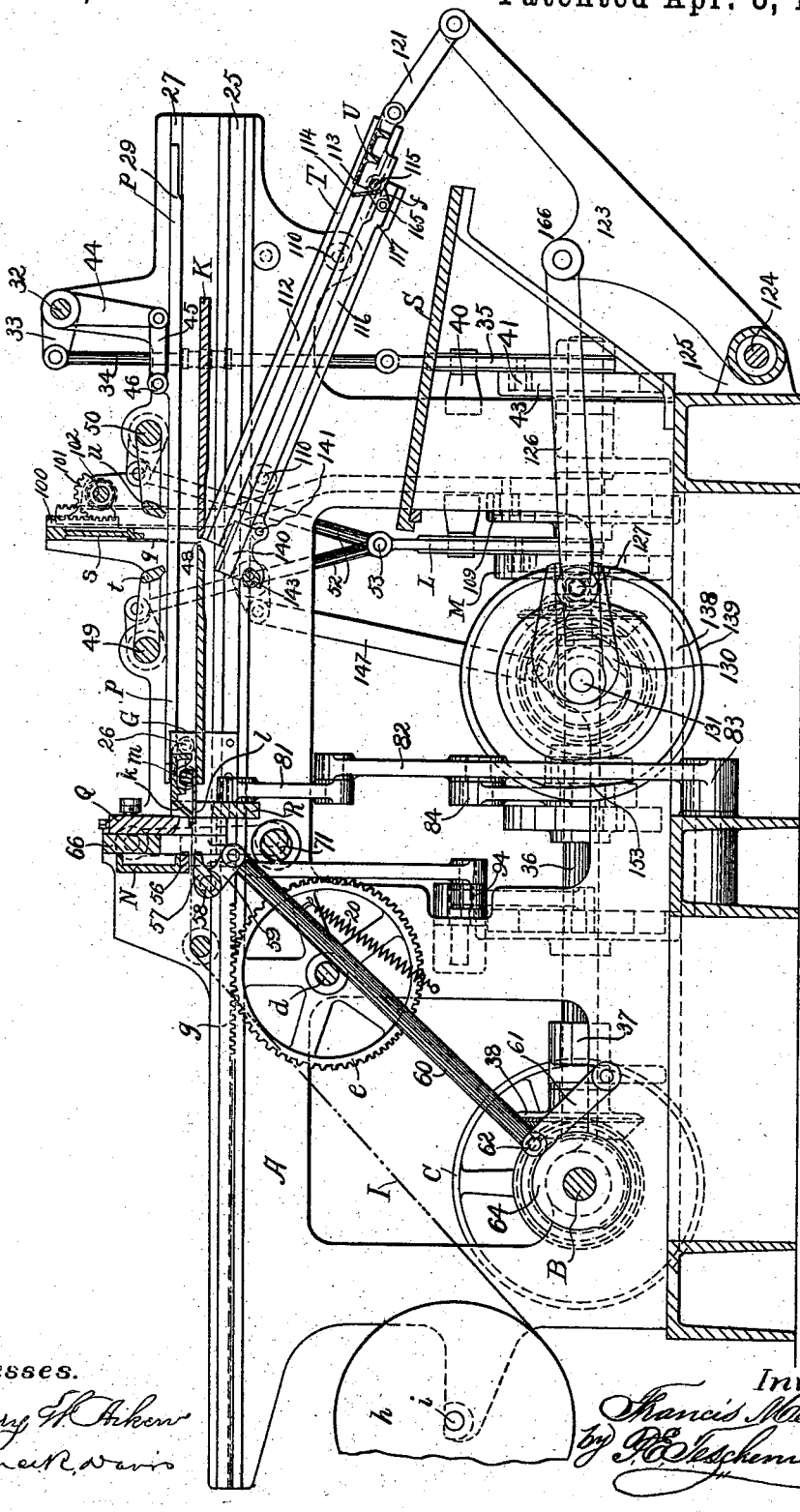
Figure 6:
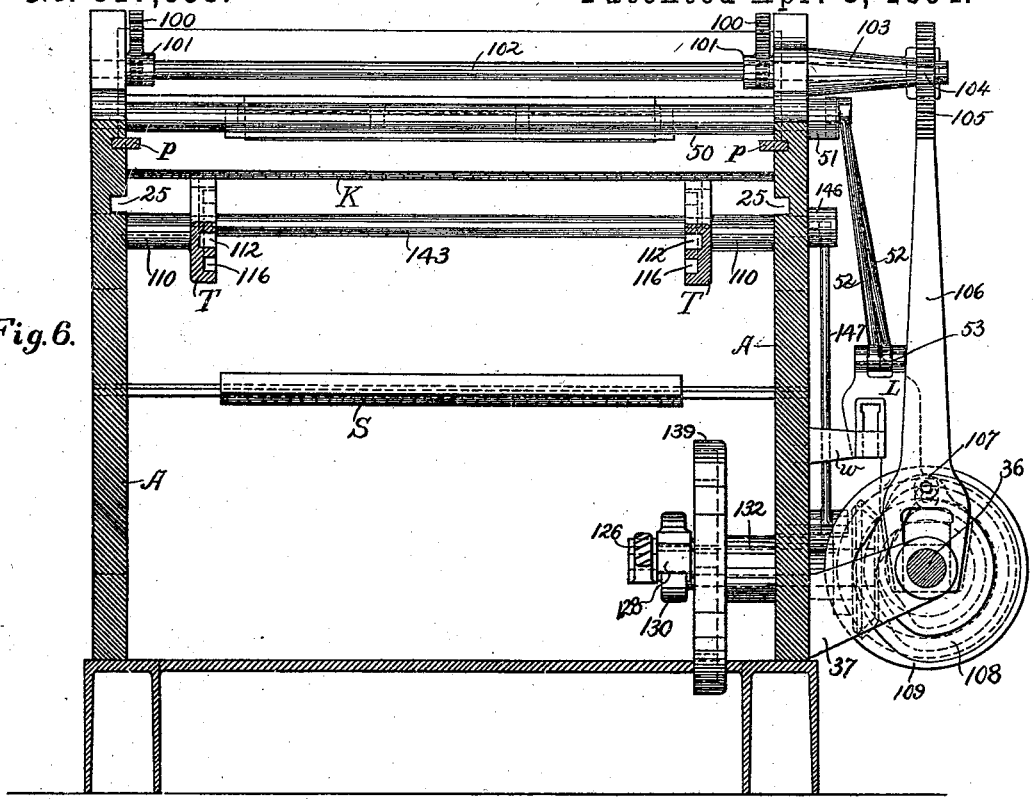
Figure 9:
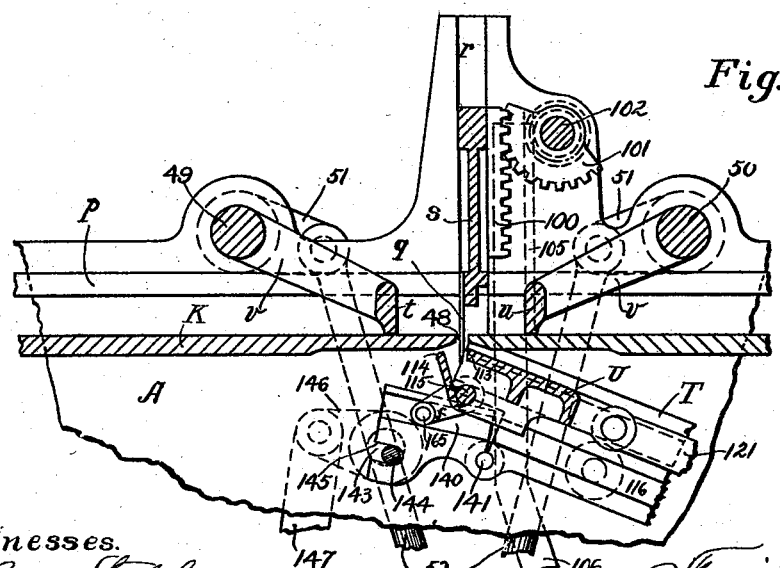
Figure 7:
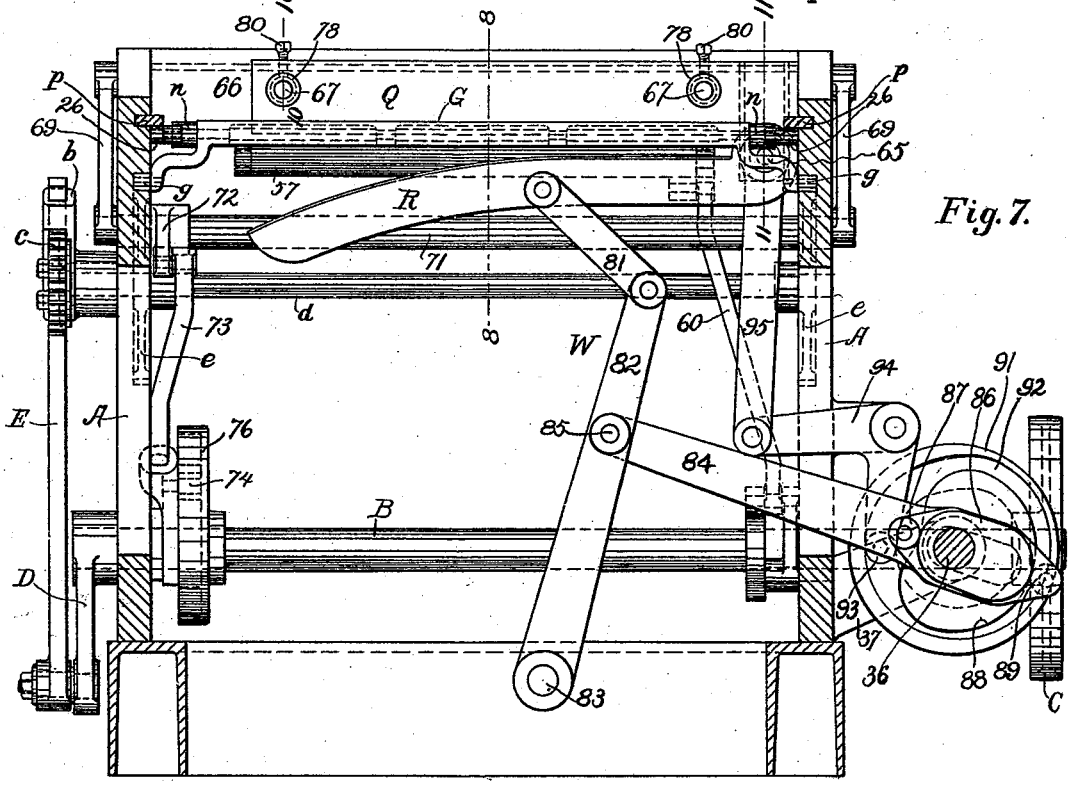
Figure 8:
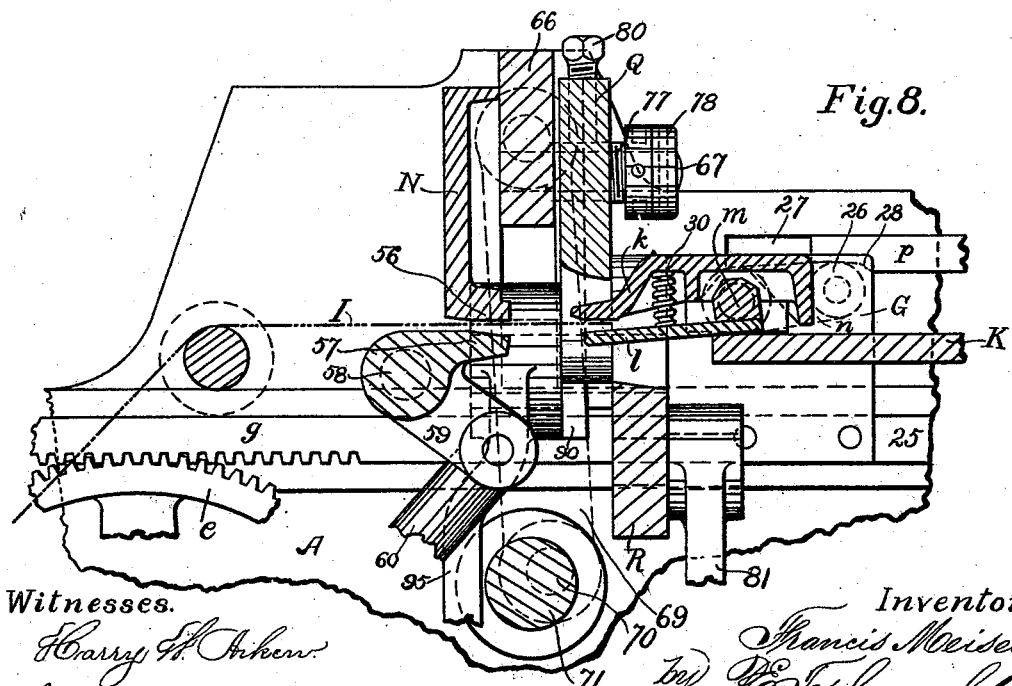
Figure 13:
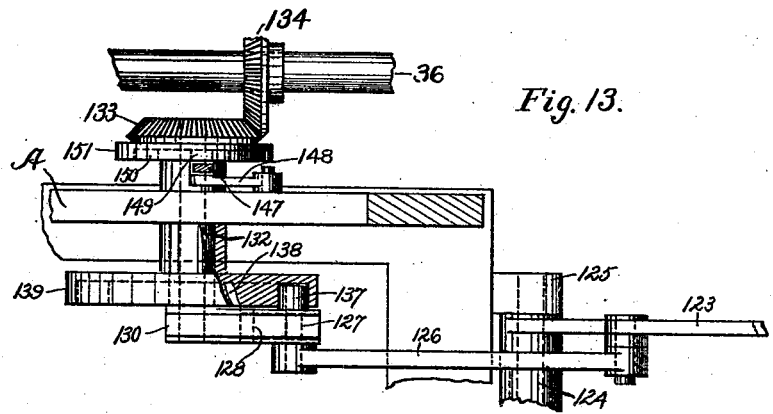
Figure 14:
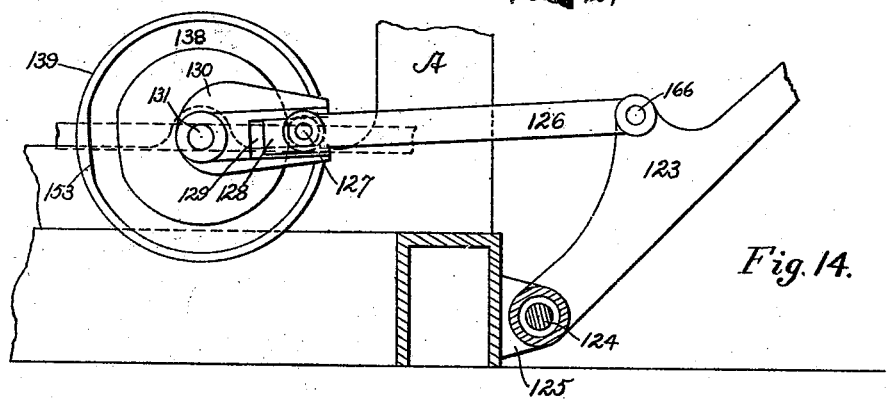

Figure 1 is a plan of my improved machine for cutting, folding, and piling cloth, paper, or other fabric for bags and other purposes. Fig. 2 is an elevation of one side of the machine with one side of the framework removed. Fig. 3 is an elevation of the opposite side of the machine. Fig. 4 is a longitudinal vertical section through the center of the machine. Fig. 5 is a rear end elevation showing nothing beyond the line $x$, $x$, of Fig. 2, looking in the direction of the arrow. Fig. 6 is a transverse vertical section on the line $x$, $x$, of Fig. 2, looking in the direction of the arrow, showing nothing beyond the line $y$, $y$, of Fig. 2. Fig. 7 is a transverse vertical section on the line $y$, $y$, of Fig. 2. Fig. 8 is an enlarged sectional detail of the feed-grippers and cutting mechanism, and parts adjacent thereto on the line 8, 8, of Fig. 7. Fig. 9 is an enlarged sectional detail of the folding mechanism. Fig. 10 is an enlarged vertical section on the line 10, 10, of Fig. 7. Fig. 11 is an enlarged sectional detail of the fulcrum of the lower cutter on the line 11, 11, of Fig. 7. Fig. 12 is a sectional plan detail of the slide to which is secured the pivot pin of the lower cutter. Fig. 13 is a plan detail of a part of the driving mechanism for operating the delivery grippers. Fig. 14 is a side elevation of the same. Fig. 15 is a side elevation of the cam M and parts adjacent thereto.

My invention relates to machines for cutting into lengths, folding, and piling cloth, paper, or other fabric for bags and other purposes; and my invention consists in the peculiar construction and combination of devices that will be more fully set forth hereinafter and particularly pointed out in the claims.

In the said drawings, A represents the framework of the machine, in suitable bearings in which runs the driving shaft B carrying at one end a driving pulley C, and at its opposite end the crank D to which is pivoted a rack-bar E which slides in a rack-guide or casing $b$ and meshes with a gear $c$ on a transverse shaft $d$ which carries two large gears $e$, $e$, one on each side of the machine on the inner side of the framework, the rack-guide $b$ being pivoted on the shaft $d$. These gears $e$, $e$, engage with two long rack-bars $g$, $g$, which are fitted to slide in longitudinal grooves or guideways 25 in the sides of the framework, and to these rack-bars is secured the feed-gripper carriage G which extends transversely across the machine and carries the feed-grippers which seize the front end of the web I of cloth or other fabric from which the bag or other article is to be made, and as the carriage G is actuated by the rack-bars $g$, $g$, gears $e$, and the connections described, draw out the web over a table K a distance equal to the length of the piece of material or bag-length which it is desired to cut off. The web I is drawn from a roll $h$ which is mounted on a shaft $i$, the journals of which rest in suitable bearings in brackets on the framework as shown in Figs. 1, 2, 3, and 4. The said feed-grippers consist of a stationary upper jaw $k$, forming a part of the carriage G, and a movable lower jaw $l$, the latter secured to a shaft $m$ adapted to oscillate in bearings in the ends of the carriage G and having secured to each of its ends an arm or lever $n$, shown in Figs. 1, 2, and 7, and dotted in Fig. 8, which carries a cam roll 26 which runs in contact with the under side of a cam-bar $p$, fitted to slide in a horizontal guide-groove or way 27 in the framework; each of said cam-bars having two cams or shoulders 28, 29, one at each end, as shown in Figs. 2 and 4.

The feed grippers $k$, $l$, must necessarily open before reaching the end of the web which they are to seize, and close before the gripper carriage starts back to pull out the fabric to the desired distance to form a bag-length. This is accomplished by the horizontally moving cam-bars $p$, $p$, the cams or shoulders 28, 29, of which act on the cam-rolls 26 at the ends of the cam-levers n secured to the shaft of the movable gripper-jaw and rock it to close the grippers onto the end of the web. As the grippers move forward toward the end of the web to seize it, and shortly before they arrive at the end of their forward traverse, the cam-rolls 26 reach the shoulders 28 of the cam-bars p, which permits the movable gripper-jaw l to be forced open by springs 30, one of which is shown in Fig. 8. As the gripper carriage G continues its forward movement to the end of its traverse to allow the end of the web to get between the gripper jaws, the cam-bars p are moved in the same direction as the carriage and at the same speed, keeping the shoulders 28 close up to the rolls 26, and as soon as the carriage arrives at the end of its traverse, the cam-bars p are suddenly pushed forward, causing the shoulders 28 to strike the cam-rolls 26 and instantly close the grippers onto the end of the web. The gripper-carriage G now moves backward, pulling the material with it to draw out a piece or blank of the desired length, the cam-bars p remaining stationary until the required length of fabric has been pulled out, at which instant the cam-rolls 26 will have reached the rear shoulders 29 of the cam-bars p, when a still further forward movement of the said cam-bars takes place which has the effect of causing the cam-rolls to pass the shoulders 29 at greater speed than if the cam-bars had remained stationary, thus opening the grippers instantly to release the web at the exact point required, whereby the length of the piece of fabric pulled out is determined with the greatest accuracy. The cam-bars then commence to move backward and return to their normal position (which is, when in position to open the grippers to receive the end of the web), finishing their movement in this direction before the gripper-carriage returns to the position at which the grippers open to allow the end of the web to get between them.

The cam-bars p are reciprocated at the proper time to operate as above described in the following manner:—In suitable bearings in the framework is supported a rock-shaft 32, carrying at one end a lever 33 to which is pivoted a connecting rod 34 pivoted at its lower end to a vertical slide 35, which is bifurcated at its lower end as shown in Fig. 5, and embraces a horizontal shaft 36 revolving in bearings in brackets 37 on the framework, and carrying a bevel-wheel 38 which meshes with a bevel-wheel 39 on the driving shaft B. The slide 35 is steadied by a guide 40 and carries a cam-roll 41 which runs in a cam-groove 42 in a cam-wheel 43 secured to the shaft 36, whereby an oscillating movement is transmitted to the shaft 32. To this shaft 32 are secured on the inside of the framework, two arms or levers 44, to which are pivoted two links 45 pivoted at their opposite ends to lugs 46 projecting from the cam-bars p which thus derive their motion from the cam-wheel 43 and are actuated as previously described to open and close the feed-grippers. The connecting rod 34 is made in two parts joined together by a right and left screw-nut 47, whereby the length of the rod 34 can be varied to adjust the cam bars p, whereby I am enabled to adjust with the greatest nicety the point at which the grippers release the end of the web or sheet. As soon as the grippers have released the web, the gripper-carriage travels still farther backward in the same direction without carrying the fabric with it, this extra movement of the gripper carriage being necessary in order to give other mechanism to be hereinafter described, time to act in the proper manner.

The table K is made in two parts, the edges of which are separated from each other, forming a narrow space or slot 48 through which descends the folding blade q, which is secured to a transverse frame or holder s adapted to slide up and down in vertical grooves or ways r in uprights rising from the sides of the framework and actuated by mechanism to be hereinafter described. On each side of the folding blade q and at an equal distance therefrom, are arranged two clamping bars t, u, which extend transversely across the table K and are connected by arms v with rock-shafts 49, 50, each of which is provided at one end, outside the framework, with an arm or lever 51, to which is pivoted a rod 52. These two rods 52 are both pivoted at 53 to a vertical slide L provided with a cam-roll 54 fitting within a cam-groove 55 in a cam wheel M, (Figs. 1, 3, and 15,) on the horizontal shaft 36, the slide L being steadied in its movements by a guide w projecting from the framework, as shown in Fig. 3. As soon as the cloth has been pulled out over the table K to the full distance desired, it is released as before stated by the grippers k, l, and at the same instant the clamps t, u, are brought down upon the table K, holding the material firmly on each side of the folding blade q, whereby said folding blade is caused to strike it exactly in the center of its length, the clamping bars t, u, being raised to release the material at the same instant that the folding blade q is brought into contact therewith, or just previous to such contact, whereby it is free to be forced through the slot 48, after which it is seized and drawn entirely through said slot by mechanism to be hereinafter described. Simultaneously with the release of the sheet or piece of fabric by the feed grippers, the material is clamped across its entire length between a pair of clamping jaws 56, 57, located at a point near where the end of the web is first seized by the feed grippers. The upper jaw 56 is stationary, being formed upon a transverse bar N secured to and extending between the sides of the framework, while the lower or movable jaw 57 is secured to a rock-shaft 58 provided at one end with an arm or lever 59, to which is pivoted a connecting-rod 60 jointed at its lower end to a link 61, Figs. 1 and 4, pivoted to the framework, said rod 60 being provided at its junction with the link 61 with a cam-roll 62, which is acted upon by a cam-wheel 64 on the driving shaft B, whereby as said cam-wheel 64 is rotated, the clamping jaw 57 is actuated against the resistance of a spring 20 to hold the material while a piece of the desired length to form a bag or other article is being cut off by mechanism which will now be described.

Q, R, are a pair of shears or cutters arranged a little in front of and parallel with the clamping-jaws 56, 57, the upper cutter Q having a straight horizontal edge, while the lower cutter R is curved to produce a shearing cut as it is swung upward on its pivot pin or fulcrum 65, the latter being secured to and projecting from a slide to be hereinafter described, fitting within a vertical groove in the upper cutter Q.

The upper cutter Q has an upward vertical movement simultaneously with the downward swing of the lower cutter, in order to permit the feed grippers k, l, to pass between the cutters to seize the end of the web, as shown in Fig. 8, and as the latter is drawn out over the table K, the upper cutter is brought down to the level of the fabric before the commencement of the cut. The vertical movement of the upper cutter Q is attained by means of a transverse slide-bar 66, to which said cutter Q is adjustably secured upon studs or pins 67 as shown in Figs 7 and 10. The bar 66 reciprocates in vertical slots 68 in the framework, and has pivoted to its opposite ends short connecting-rods 69, the lower ends of which are connected to eccentrics 70 on a shaft 71, which latter is provided with an arm or lever 72 to which is pivoted a connecting-rod 73, the lower end of which carries a cam-roll 74 and is enlarged and bifurcated to embrace the driving shaft B, which forms a guide therefor. The cam-roll 74 engages in a cam-groove 75 on a cam-wheel 76 fixed upon the shaft B, the cam-groove being of the proper shape to transmit the desired vertical movement to the upper cutter Q at the desired times.

The cutter Q is made adjustable horizontally toward and from its supporting slide-bar 66 by means of tubular adjusting screws 77, Fig. 10, fitted over the supporting studs 67, and passing through the cutter Q, the said screws being prevented from moving longitudinally on the said studs by heads 78 secured to the ends of the studs by pins 79. The screws 77 are clamped in place after adjustment by means of vertical set screws 80, and by means of the above described adjustment the cutters can be moved forward and back in a horizontal plane to vary the length of the piece of fabric or bag-length cut off as may be desired.

The lower cutter R is swung up and down on its pivot pin or fulcrum 65 by means of a toggle W, Fig. 7, the upper member 81 of which is pivoted to the cutter, while the lower member 82 is pivoted at 83 to the bed of the machine and is actuated by a connecting-rod 84 pivoted thereto at 85 as shown in Fig. 7, and having its outer end slotted for the passage of the shaft 36 which forms a guide therefor, said rod being actuated in one direction, to raise the cutter R, by a cam 86 on the shaft 36 which acts on a cam-roll 87, and in the opposite direction, to swing the cutter R downward, by a cam 88 on the said shaft, which acts upon a cam-roll 89, said cam rolls being mounted on studs projecting from said connecting rod 84.

It is desirable that the lower cutter should have the least possible amount of upward swing for the reason that if it should travel through a considerable space it would attain too much momentum which would carry it up beyond the desired point. I therefore secure the pivot-pin or fulcrum 65 of the cutter R to a slide 90, which moves in a vertical dovetail guide-groove 21, formed at one end of the upper cutter Q, as shown in Fig. 12, said slide 90 being actuated to raise and lower the pivot-pin 65 by a cam-wheel 91 secured to the shaft 36 and having a cam-groove 92 with which engages a cam-roll 93 on a bell-crank lever 94 to which is pivoted a connecting-rod 95, the upper end of which is pivoted to the slide 90, whereby as the cam wheel 91 is rotated, the pin or fulcrum of the swinging cutter R is raised and lowered at the required times. By thus lowering the pivot-pin of the cutter R, which takes place at the same time that the upper cutter is raised, as previously described, plenty of space is afforded for the advance of the feed-grippers k, l, between the said cutters to seize the end of the web as shown in Fig. 8, and after the grippers are withdrawn, the pivot-pin 65 is raised to its highest position, thereby necessitating less upward swing of the cutter R to make the cut, and a corresponding reduction in the momentum attained by said cutter.

The frame or holder s, to which the folding blade q is secured, is actuated in the following manner: To the ends of the frame s are secured two racks 100, with which mesh two segment-pinions 101 secured inside the framework, to a transverse shaft 102, one end of which passes through a long bearing or hub 103, Fig. 6, outside the framework, and has secured to its end a pinion 104 with which engages a rack 105 formed at the end of a rod 106 the lower bifurcated end of which embraces the shaft 36 and carries a cam-roll 107 which fits within a cam-groove 108 in a cam-wheel 109 fixed upon the shaft 36, which thus transmits the desired vertical movement to the folding blade q at the proper times.

I will now describe the mechanism by means of which the sheet or piece of fabric after being drawn over the table K, cut from the web, and forced by the folding blade q down through the slot 48 in the said table, is seized at the fold, drawn through the said slot and delivered onto a table S upon which the sheets or blanks folded exactly in the center of their length by the blade $q$ are successively deposited in a pile to be subsequently removed and made into bags or other articles.

T, T, are inclined ways or guide-bars supported on studs or hubs 110 projecting from the inner side of the framework. These ways are provided with guide-grooves 112 in which slide the ends of the delivery-gripper-carriage U, which extends transversely across the machine and carries the delivery-grippers consisting of a stationary upper jaw 113 forming a part of the carriage, and a movable jaw 114, the latter being secured to a rock shaft 115, adapted to oscillate in bearings in the ends of the carriage U, and having secured to each end an arm or lever $f$ shown in Figs. 4 and 9 which carries a cam-roll 165 adapted to run in a longitudinal groove 116 parallel with the groove 112 and provided near its rear or lower end with a cam or inclined portion 117 which acts on the cam-roll 165 and permits the movable jaw of the delivery-grippers to open, thus releasing the sheet when the gripper-carriage has arrived in the position shown in Fig. 4. The delivery gripper carriage U is reciprocated in its guideways 112 to advance the delivery grippers into a position beneath the slot 48 of the table K as shown in Fig. 9, to receive and seize the folded sheet and then draw back the said grippers with the sheet into the position shown in Fig. 4, by mechanism which will now be described. To the opposite rear ends of the delivery-gripper-carriage U are pivoted two links 120, 121, which are also pivoted to arms 122, 123, the lower ends of which are secured to a transverse rock-shaft 124 supported in bearings in lugs 125 at the base of the framework. To the arm 123 is pivoted at 166 a connecting-rod 126, to the inner end of which is secured a stud or short shaft 127, which passes through a flanged journal-box 128 which is adapted to slide back and forth in an open slot 129 formed in a crank 130 secured to the end of a shaft 131 which rotates in a hub 132, Fig. 6, formed on the framework and carries at its outer end a bevel wheel 133 meshing with a bevel wheel 134 on the shaft 36 which thus transmits motion to the crank 130. To the outer end of the stud 127 is secured a cam-roll 137, Fig. 13, which engages with a substantially circular cam-groove 138 in a stationary cam-disk 139 secured to the hub 132, whereby as the slotted crank 130 is rotated, the cam-roll 137 is caused to travel in the cam groove 138 around the cam-disk 139, thus reciprocating the connecting rod 126 and causing the delivery-gripper-carriage to move backward and forward in its guideways 112 at the proper times.

It will be obvious that the delivery-grippers which seize the folded sheet must be open when they arrive under the slot 48 in the table K in order to receive the doubled portion of the sheet as it is forced through said slot by the folding blade $q$, and that said grippers must then be tightly closed to firmly seize the sheet before the gripper-carriage U commences to move backward. This closing of the delivery-grippers could not be effected by cams or inclines in the grooves 116, as this would necessitate the starting of the carriage U on its backward traverse before the grippers could be closed. To effect this closing of the grippers before the gripper-carriage starts back, the front lower portions 140 of the ways T, T, are hinged at 141 and adapted to be swung downward into the position shown in Fig. 9, and as soon as the cam-rolls 165 have passed into the portions of the grooves 116 contained in said hinged portions 140, the latter commence to drop, which causes the arms $f$ to rock the shaft 115 and open the grippers to receive the doubled portion of the sheet or bag length, which is at that instant pushed through the slot 48 by the folding blade $q$, immediately after which the portions 140 begin to swing upward on their hinges, causing the grippers to seize the material with a slight grip on both sides of the folding blade $q$, which is at the same instant withdrawn, leaving the doubled length of material between the gripper jaws, which are tightly closed immediately after the gripper-carriage U has stopped at the end of its forward traverse, said carriage then starting back on its rearward traverse and pulling the sheet with it through the slot 48 until the cam-rolls 165 strike the cams 117, when the grippers are opened to release the sheet which is then delivered onto the table S. The hinged portions 140 of the ways T are swung up and down at the proper times by means of a transverse rock-shaft 143 having its bearings in the sides of the framework, said shaft 143 being provided with two eccentrics 144, Figs. 1, 2, and 9, which fit within open slots 145 in the hinged portions 140, whereby said portions are raised and lowered as the shaft 143 is oscillated by mechanism which will now be described. To one end of the shaft 143 is secured a lever or arm 146 to which is pivoted a connecting-rod 147 jointed at its lower end to a link 148 pivoted to the framework, said rod 147 being provided at its junction with the link 148 with a cam-roll 149 which engages a cam-groove 150 in a cam-wheel 151, Figs. 3 and 13, secured to and forming a part of the bevel-wheel 133, the motion of which is thus transmitted to the rock-shaft 143 to actuate the hinged portions of the ways T as previously described. On the arrival of the gripper-carriage at the end of its forward traverse it is given a slight dwell or rest in order that sufficient time may be afforded for the introduction of the doubled sheet or bag-length between the delivery-grippers, and to allow the latter to take a firm hold upon the said bag-length before the gripper-carriage starts on its return movement. This dwell is effected by providing the cam groove 138 of the cam-disk 139 with a flattened portion 153, Fig. 14, in which the cam-roll 137 travels while the gripper carriage U is at the forward end of its traverse, said portion 153 forming the arc of a circle struck from the pivot 166 as a center, when said pivot has completed its forward movement, whereby the time occupied by the crank 130 in passing the dead-center is practically prolonged during the time that the cam-roll 137 is passing through the flattened portion 153 of the cam-groove, at which time the connecting rod 126 merely swings on its pivot 166 as a center, while the journal-box 128 simultaneously slides in the open slot 129 of the crank 130.

What I claim as my invention, and desire to secure by Letters Patent, is—

1. In a cutting and folding machine, the combination of a reciprocating carriage provided with feed-grippers adapted to seize the end of the fabric and draw it out a distance equal to the required length to be cut off, a clamping device adapted to hold the web after a given length has been drawn out, cutters adapted to sever from the web the piece drawn out by the feed-grippers, a folding-blade adapted to fold the severed sheet or piece of fabric, clamps arranged on each side of the folding blade and adapted to hold the fabric in place as soon as it has been drawn out to the required length, and release it at or before the contact of the folding-blade therewith, and grippers for taking the folded sheet from the folding-blade and delivering it, substantially as set forth.

2. In a cutting and folding machine, the combination of a reciprocating carriage provided with feed-grippers for seizing the end of the fabric and drawing it out, said gripper-carriage and grippers having a traverse of greater length than that of the piece or length of fabric to be cut off, a table over which said fabric is drawn by said grippers, clamping devices for holding the length or piece of fabric drawn out by the grippers, shears, or cutters, both members of which are movable toward and from the fabric, a folding-blade adapted to force the severed piece of fabric through a slot or opening in the table, and delivery grippers for receiving said sheet from the folding blade, drawing it through the slot or opening in the table, and delivering it folded onto a table or pile, substantially as described.

3. In a cutting and folding machine, the combination of a reciprocating carriage provided with feed-grippers adapted to seize the end of the fabric and draw it out to the desired distance, a spring for opening said grippers at each end of their traverse, and cam-bars sliding in suitable grooves and having cams or inclines acting upon arms or levers connected with the movable jaw of the grippers and adapted to close the same before the gripper-carriage starts on its backward traverse, substantially as set forth.

4. In a cutting and folding machine, the combination of a reciprocating gripper-carriage provided with feed-grippers adapted to draw out a piece of fabric of the desired length to form a blank, said grippers consisting of a stationary jaw and a movable jaw held normally open or separated by a spring, said movable jaw being secured to a rock-shaft having its bearings in the gripper carriage and provided with levers carrying cam rolls, cam bars sliding in grooves in the framework and having cams or inclines with which said cam-rolls engage, and mechanism for reciprocating the cam-bars, whereby the grippers are closed upon the end of the fabric on the arrival of the gripper-carriage at the end of its forward traverse, and opened when a piece of the fabric of sufficient length for a blank has been pulled forward by the movement of the gripper carriage, substantially as set forth.

5. In a cutting and folding machine, the combination of the shears or cutting-blades, the upper one having a vertical movement toward and from the fabric and the lower one having a swinging movement on a pivot or fulcrum, and a reciprocating carriage provided with feed-grippers adapted to pass between said cutting-blades when separated from each other to seize the end of the fabric, substantially as set forth.

6. In a cutting and folding machine, the combination of the shears or cutters, the upper one having a straight vertical movement toward and from the fabric, and the lower one having a swinging movement on a pivot having a vertical movement, whereby the fulcrum of the swinging cutter is raised just previous to the cut being made, a reciprocating carriage provided with feed-grippers adapted to pass between said cutting blades when separated in order to seize the end of the web and draw the same forward, and a clamping device for holding the fabric while being cut, substantially as set forth.

7. In a cutting and folding machine, the combination, with the upper cutter having a vertical movement in suitable guides toward and from the fabric to be cut, of a lower swinging cutter co-operating therewith and having its fulcrum pin or pivot on a slide reciprocating vertically in a guideway at one end of the upper cutter, and mechanism for actuating the upper and lower cutters and reciprocating the fulcrum-pin slide of the lower cutter on the upper cutter, substantially as and for the purpose set forth.

8. In a cutting and folding machine, the upper cutter Q supported by and made adjustable horizontally toward and from its supporting bar 66 by means of tubular screws 77 passing through said cutter and fitting over supporting studs 67 projecting from the bar 66 and having heads 78, and the set screws 80 for clamping the tubular screws 77, all substantially as described.

9. In a cutting and folding machine, the combination, with the reciprocating gripper carriage G, the feed grippers $k$, $l$, and their actuating cam-bars $p, p$, of the rock-shaft 32, levers 44, links 45, lever 33, rotary cam-wheel 43, and the connecting rod 34, provided with an adjusting-screw-nut 47, whereby its length may be varied to adjust the cam-bars $p, p$, all substantially as described.

10. In a cutting and folding machine, the combination, with the table K provided with a narrow slot or opening 48, and the vertically reciprocating folding blade $q$, of the clamping bars $t, u$, arranged on opposite sides of said folding blade and secured to the rock-shafts 49, 50, said shafts provided with arms or levers 51, the connecting rods 52, the slide L, and the rotary cam-wheel M, all operating substantially as set forth.

11. In a cutting and folding machine, the combination with the lower swinging cutter R, of the cutter Q and its vertically reciprocating supporting bar 66, the rock-shaft 71 provided with an arm or lever 72 and eccentric 70, the rods 69 connecting the eccentrics 70 with the bar 66, the cam wheel 76 and the connecting rod 73 actuated by said cam-wheel and connected with the lever 72 of the rock-shaft 71, all operating substantially as described.

12. In a cutting and folding machine, the combination, with the vertically reciprocating cutter Q and its actuating mechanism, of the swinging cutter R having its fulcrum on a slide 90 moving vertically in a guideway on the cutter Q, the toggle lever W, the connecting rod 84 and the cams 86, 88, for actuating the rod 84, all operating substantially as described.

13. In a cutting and folding machine, the combination of the feed-gripper-carriage G and its feed-grippers, of the rack bars $g, g$, sliding in longitudinal grooves in the framework and secured to the carriage G, the gears $e, e$, shaft $d$, gear $c$, rack-bar E, crank D, and the shaft B, all operating substantially as set forth.

14. In a cutting and folding machine, the combination, with a table over which the fabric is drawn, and a reciprocating folding-blade adapted to force the fabric or blank through a slot or aperture in said table, of a reciprocating carriage provided with delivery-grippers adapted to be moved into a position beneath the table to receive the doubled sheet from the folding blade, means for opening said grippers at each end of their traverse to receive and release the fabric or blank, and means for closing said grippers tightly onto the doubled fabric before the gripper-carriage starts on its backward traverse, substantially as set forth.

15. In a cutting and folding machine, the combination, with the delivery-gripper-carriage and its guideways, of delivery-grippers having a movable jaw secured to a rock shaft provided with levers having cam-rolls moving in cam-grooves in the delivery-gripper-carriage guideways, the front ends of said cam-grooves being located in movable portions at the front ends of said guideways, and means for depressing and raising said movable portions to open and close the delivery-grippers at the required times, substantially as set forth.

16. In a cutting and folding machine, the combination, with the delivery-gripper-carriage, reciprocating in suitable guideways and means for actuating the same, of the delivery grippers, consisting of a stationary jaw and a movable jaw, the latter secured to a rock-shaft having its bearings in the gripper-carriage and provided with levers $f$ and cam-rolls 165, and the guideways T provided with cam-grooves 116 for the reception of the cam-rolls 165 and having their front ends movable, and means for depressing and raising said movable portions of the guideways whereby the delivery grippers are opened at the end of their forward traverse to receive the folded fabric from the folding-blade, and closed tightly to grip the same before the gripper-carriage starts on its backward traverse, substantially as set forth.

17. In a cutting and folding machine, the combination, with the delivery-gripper-carriage and the delivery-grippers, of the guideways T provided with guide-grooves 112 for said gripper-carriage, and cam-grooves 116 parallel therewith and having cams or inclines 117 at their rear ends, the movable portions 140, the rock-shaft 143 provided with eccentrics 144 connected with said movable portions 140, the lever 146 on the rock-shaft 143, the connecting-rod 147 and the cam-wheel 151 adapted to actuate the rod 147 to depress and raise the movable portions 140 of the guideways T, all operating substantially in the manner and for the purpose set forth.

18. In a cutting and folding machine, the combination of feed-grippers mounted on a reciprocating carriage, means for actuating said grippers whereby they are opened to receive the fabric at the end of their forward traverse, and closed before the gripper carriage starts on its backward traverse, and again opened to release the fabric after a piece of the desired length has been drawn out, a table over which the fabric is drawn by said grippers, clamps for holding the fabric when drawn out, cutters, both members of which have a vertical movement toward and from the fabric, a folding-blade adapted to force the severed piece of fabric through a narrow slot or opening in the table, delivery grippers mounted on a reciprocating carriage, driving mechanism for said carriage constructed to produce a rest or dwell of the same at the end of its forward traverse, guideways for said delivery-gripper-carriage having longitudinal cam-grooves, a rock-shaft to which is secured the movable jaw of the delivery-grippers, said rock-shaft having levers provided with cam-rolls engaging said cam-grooves of the guideways, and said guideways having their front portions movable as described, and means for depressing and raising said movable portions to open and close the delivery grippers at the required times, all constructed to operate substantially in the manner and for the purpose set forth.

Witness my hand this 19th day of April, A. D. 1893.

FRANCIS MEISEL.

In presence of—
P. E. TESCHEMACHER,
S. MERTSCHINSKY.